(12) United States Patent
Schultz et al.

(10) Patent No.: US 8,399,064 B2
(45) Date of Patent: **\*Mar. 19, 2013**

(54) PROCESS FOR IMPROVING THE ADHESION OF CARBON FIBRES WITH REGARD TO AN ORGANIC MATRIX

(75) Inventors: Jacques Schultz, Riedisheim (FR); Michel Nardin, Angeot (FR); Frédéric Vautard, Parey Sous Montfort (FR); Vincent Roucoules, Carspach (FR); Brigitte Defoort, Saint Medard en Jalles (FR)

(73) Assignee: Astrium SAS, Paris (FR)

( * ) Notice: Subject to any disclaimer, the term of this patent is extended or adjusted under 35 U.S.C. 154(b) by 710 days.

This patent is subject to a terminal disclaimer.

(21) Appl. No.: 12/518,354

(22) PCT Filed: Dec. 10, 2007

(86) PCT No.: PCT/EP2007/063597
§ 371 (c)(1),
(2), (4) Date: Aug. 25, 2009

(87) PCT Pub. No.: WO2008/071652
PCT Pub. Date: Jun. 19, 2008

(65) Prior Publication Data
US 2010/0092695 A1    Apr. 15, 2010

(30) Foreign Application Priority Data

Dec. 11, 2006    (FR) ..................... 06 55417

(51) Int. Cl.
*B05D 1/36* (2006.01)
*B05D 7/00* (2006.01)
(52) U.S. Cl. ............... 427/407.1; 427/487; 427/532; 427/569; 526/273

(58) Field of Classification Search .................. 427/220, 427/221, 248.1, 249.1, 249.3, 249.6, 385.5, 427/386, 407.1, 487, 532, 569; 526/273
See application file for complete search history.

(56) References Cited

U.S. PATENT DOCUMENTS 3,837,904 A    9/1974 Hill
3,855,174 A *  12/1974 Brie et al. ..................... 523/206
(Continued)

FOREIGN PATENT DOCUMENTS

EP    0 640 702 A1    3/1995
EP    0 965 679 A1   12/1999
(Continued)

OTHER PUBLICATIONS

Fujisawa et al., Grafting of Styrene onto Carbon Fibers having Pendant Thiol Groups, Makromol. Chem. vol. 183, pp. 2923-2933 (1982).*

(Continued)

*Primary Examiner* — Timothy Meeks
*Assistant Examiner* — Michael P Rodriguez
(74) *Attorney, Agent, or Firm* — Oblon, Spivak, McClelland, Maier & Neustadt, L.L.P.

(57) ABSTRACT

The invention relates to a process for improving the adhesion of carbon fibers by coating a surface of the carbon fibers with a polymer film containing functional groups capable of acting as chain transfer agents during a chain transfer polymerization of a resin curable by chain transfer polymerization to obtain coated carbon fibers. The coated carbon fibers are then contacted with the curable resin, and the chain transfer polymerization of the curable resin is induced to produce an organic matrix and forming a composite material. The functional groups of the polymer film act as chain transfer agents during the chain transfer polymerization of the curable resin and thereby improve adhesion of the carbon fibers to the organic matrix. Applications of this invention include aeronautical, aerospatial, shipbuilding, railway and motor vehicle industries, armaments industry, sports and leisure articles, and the like.

20 Claims, 1 Drawing Sheet

U.S. PATENT DOCUMENTS

| | | | |
|---|---|---|---|
| 3,994,742 A | | 11/1976 | Russell et al. |
| 4,446,255 A * | | 5/1984 | Ying et al. .................... 523/205 |
| 6,099,910 A * | | 8/2000 | Woodside ..................... 427/386 |
| 6,203,814 B1 * | | 3/2001 | Fisher et al. .................. 424/443 |
| 6,368,712 B1 * | | 4/2002 | Kobayashi et al. ........... 428/367 |
| 8,048,940 B2 * | | 11/2011 | Lukehart et al. .............. 523/215 |
| 2009/0280157 A1 * | | 11/2009 | Maas et al. .................... 424/426 |

FOREIGN PATENT DOCUMENTS

| | | |
|---|---|---|
| EP | 1 484 435 A2 | 12/2004 |
| JP | 56-91071 | 7/1981 |
| JP | 3-76869 | 4/1991 |
| JP | 5-195440 | 8/1993 |
| JP | 2002-327374 | 11/2002 |
| WO | WO 2007/031576 A1 | 3/2007 |

OTHER PUBLICATIONS

Holmes et al., Amination of Ultra-High Strength Polyethylene using Ammonia Plasma [Abstract], Composites Science and Technology, vol. 38, Issue 1, (1990).*

Kettle et al., Plasma Polymerisation for Molecular Engineering of Carbon-Fibre Surfaces for Optimised Composites, Composites Science and Technology, vol. 57, pp. 1023-1032, (1997).*

Loh et al., Modification of Carbon Surfaces in Cold Plasmas, Journal of Materials Science, vol. 22, pp. 2937-2947, (1987).*

Siffer et al., A Chemometric Investigation of the Effect of the Process Parameters during Maleic Anhydride Pulsed Plasma Polymerization, Analytica Chimica Acta, vol. 539, pp. 289-299, (2005).*

Tang et al., A Review for Improving the Interfacial Adhesion Between Carbon Fiber and Polymer Matrix, Polymer Composites, vol. 18, No. 1, pp. 100-113, (Feb. 1997).*

Zsigmond et al., Electron Beam Processing of Carbon Fibre Reinforced Braided Composites, Radiation Physics and Chemistry, vol. 67, pp. 441-445, (2003).*

N. Tsubokawa, Cationic Graft Polymerization of Polymers from Carbon Fiber Initiated by Acylium Perchlorate Groups Introduced onto the Surface, Carbon, vol. 11, No. 8, pp. 1257-1263, (1993).* de Albuquerque et al., Study of the Interconversion of Polyaniline Oxidation States by Optical Absorption Spectroscopy, Synthetic Metals, vol. 146(1), pp. 1-10 (2004).*

Donnet et al., Carbon Fibers Third Edition, Marcel Dekker, Inc. pp. 180-189, (1998).*

Zhihong Wu, et al., "Grafting Isocyanate-Terminated Elastomers onto the Surfaces of Carbon Fibers: Reaction of Isocyanate with Acidic Surface Functions", Carbon, vol. 34, No. 1, 1996, pp. 59-67.

N. Tsubokawa, "Cationic Graft Polymerization of Polymers from Carbon Fiber Initiated by Acylium Perchlorate Groups Introduced onto the Surface", Carbon, vol. 31, No. 8, 1993, pp. 1257-1263.

F. Siffer, et al., "A Chemometric Investigation of the Effect of the Process Parameters During Maleic Anhydride Pulsed Plasma Polymerization", Analytica Chimica Acta, 539, 2005, pp. 289-299.

* cited by examiner

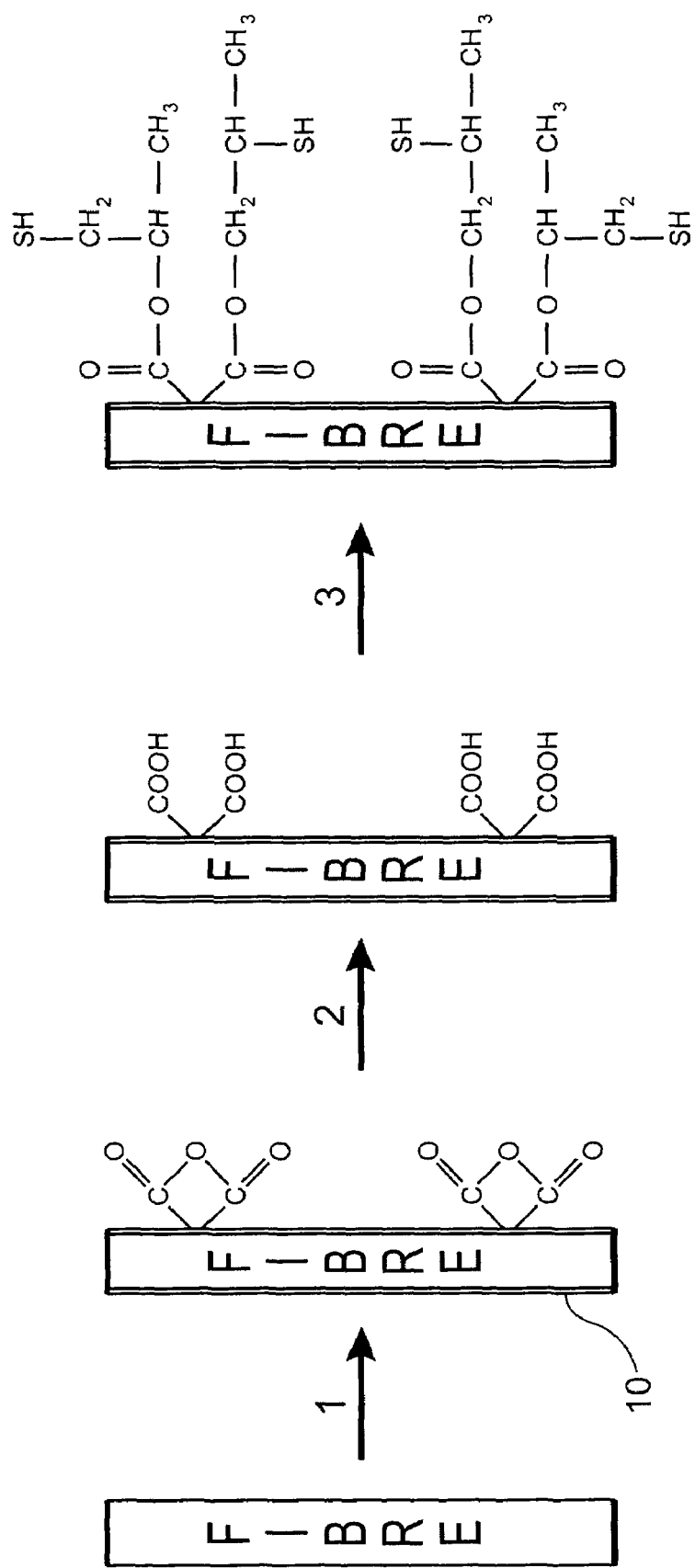

PROCESS FOR IMPROVING THE ADHESION OF CARBON FIBRES WITH REGARD TO AN ORGANIC MATRIX

TECHNICAL FIELD

The present invention relates to a process which makes it possible to improve the adhesion of carbon fibres with regard to an organic matrix forming, with these fibres, a composite material and resulting from the chain polymerization of a curable resin.

This process, which makes it possible to obtain composite materials with noteworthy properties of resistance to stresses, both transverse (that is to say, perpendicular to the axis of the carbon fibres) and longitudinal (that is to say, in the axis of the carbon fibres), is very particularly advantageous in the aeronautical and aerospatial industries, in particular in the manufacture of components of large dimensions, such as, for example, wing unit or fuselage components.

However, it can also be used in other types of industry, such as the shipbuilding, railway or motor vehicle industries, the armaments industry, for example in the production of components participating in the construction of missiles or of missile launch tubes, or also that of sports and leisure articles, for example in the production of articles intended for water sports and for sports which involve sliding.

STATE OF PRIOR ART

Composite materials are heterogeneous materials which make it possible to make use of the exceptional mechanical properties of materials, the manufacture of which is only known in the form of fibres (and not in bulk form), by embedding them in a matrix formed of a cured organic polymer (or resin), which makes it possible to bond the fibres to one another, to distribute the stresses in the composite material and to protect the fibres against chemical attacks.

A necessary condition for the production of a high-performance composite material is that the bonding between the fibres and the matrix of which it is composed be good. This is because, if the fibres/matrix bonding is inadequate, then a composite material is obtained with mediocre transverse mechanical properties (such as resistance to shearing) and thus with very limited possibilities of use, components made of composite materials generally being intended to operate under a state of three-directional stress.

Carbon is chemically rather unreactive and naturally exhibits a low adhesion with regard to polymer matrices. Consequently, manufacturers of carbon fibres have straightaway sought to adapt their fibres to the resins intended to be used as matrices by manufacturers of components made of composite materials.

Thus it is that the following have been proposed:

1) surface treatments which are all targeted at creating, at the surface of the fibres, functional groups capable of reacting with chemical functional groups carried by the resins; they are mainly electrolytic or chemical oxidation treatments (see, for example, JP-A-3076869 [1]) but other types of treatment have also been described, such as plasma heat treatments (see, for example, EP-A-1 484 435 [2]), electrolysis in an acidic or basic medium (EP-A-0 640 702 [3]) or the implantation of atoms of Si or B type (JP-B-2002-327374 [4]);

2) the use of specific sizing agents, that is to say by the deposition, on the surface of the fibres, of products having the role of enhancing the compatibility of the fibres with regard to the resins, of facilitating their impregnation by the resins and of providing "attaching" between the fibres and the matrices formed by the polymerization of these resins; generally, the sizing agents used are polymers or copolymers with complex chemical structures, the choice of which is mainly guided by experience; and 3) the grafting to the surface of the fibres of an elastomeric phase (Wu et al., *Carbon*, 34, 59-67, 1996 [5]) or of polymers of polyester, vinyl polymer (in particular polystyrene) or polyacetal type (Tsubokawa, *Carbon*, 31, 1257-1263, 1993 [6]) capable, here again, of enhancing the compatibility of the fibres with regard to the resins.

It should be noted that sizing agents are also used on the carbon fibres for other objectives than that of improving the bonding thereof with an organic matrix, such as, for example, that of facilitating the handling thereof.

While the treatments mentioned above are generally relatively effective in the case of matrices obtained by thermal polymerization of resins (that is to say, polymerization induced by heat), it turns out that they are not effective or insufficiently effective when the matrices are produced with resins, the polymerization of which is induced by light radiation (visible or ultraviolet light) or ionizing radiation ($\beta$ or $\gamma$ radiation or X-rays).

This is because experience shows that the composites obtained with resins polymerized under radiation exhibit transverse mechanical performances which are markedly inferior to those of the better composites produced with resins polymerized by the thermal route, which is conventionally interpreted as the fact that the fibres/matrix bonding remains inadequate despite the treatments applied to the carbon fibres by the manufacturers thereof.

In point of fact, the polymerization of resins under radiation moreover exhibits a number of advantages with respect to the polymerization of resins by the thermal route, these advantages being related in particular to the possibility of operating without autoclaves and thus of more easily manufacturing composite components which are large in size or complex in structure and of obtaining much higher polymerization rates, which makes possible higher production rates for lower costs.

It would thus be desirable to succeed in improving the adhesion of carbon fibres with regard to a polymer matrix in the case where this matrix is obtained by polymerization under radiation of a curable resin and more specifically of a resin having chain polymerization since, in practice, the resins which are capable of polymerizing under radiation are resins, the polymerization of which takes place by a chain mechanism.

In the context of their studies, the Inventors found that if functional groups capable of acting as chain transfer agents during the polymerization of the resin are grafted to the surface of carbon fibres, then a significant improvement in the fibres/matrix adhesion is obtained, probably because these functional groups are converted, during the polymerization of the resin, into active radical or ionic centres, by reaction with growing polymer chains, and are then capable of initiating the formation, from the surface of the fibres, of new polymer chains which are covalently bonded to this surface from the time they are created and which subsequently facilitate the transfer of the stresses from the matrix to the fibres.

However, they also found that some of the functional groups present at the surface of the carbon fibres before this grafting is carried out—and which are inherent in the process by which these fibres were obtained—are capable of exerting an inhibiting effect on the chain polymerization of resins and of thus limiting the benefit obtained by the introduction of functional groups capable of acting as chain transfer agents.

The present invention is based on this double observation.

ACCOUNT OF THE INVENTION

A subject-matter of the present invention is thus a process for improving the adhesion of carbon fibres with regard to an organic matrix forming, with these fibres, a composite material, this composite material being obtained by bringing the fibres into contact with a resin which can be cured by chain polymerization, followed by polymerization of the resin, which process consists in coating the surface of the carbon fibres, before these fibres are brought into contact with the resin, with a polymer film comprising functional groups capable of acting as chain transfer agents during the polymerization of said resin.

Thus, according to the invention, it is by coating the surface of the carbon fibres, before the latter participate in the process for the manufacture of the composite material, with a polymer film which makes it possible simultaneously:

- to isolate the surface of the fibres from the medium in which they occur and in particular from the resin and thus to prevent the polymerization of this resin from being inhibited by the functional groups present on the surface of the fibres as a result of the process by which they are manufactured,
- to confer a homogeneous surface state on the fibres, the surface of the polymer film effectively substituting for the surface of these fibres, and
- to cover the fibres with functional groups which are all capable of acting as chain transfer agents during the polymerization of the resin, that the adhesion of these fibres with regard to the organic matrix is increased.

The carbon fibres as obtained by conventional processes for the pyrolysis of polyacrylonitrile (PAN), rayon, viscose, pitch and other oil residues are each composed of a multitude of monofilaments which can be more or less bonded to one another according to the treatments to which these fibres were subjected during the manufacture thereof. For this reason, in that which precedes and in that which follows, the term "surface of the fibres" is understood to mean both the surface of the monofilaments themselves and the surface of assemblages resulting from the bonding of a plurality of monofilaments to one another. In the same way, the term "surface of a fibre" is understood to mean both the surface of a monofilament and that of an assemblage resulting from the bonding of several monofilaments to one another.

Furthermore, in that which precedes and in that which follows, the term "polymerization" should be understood as comprising not only the formation of polymer chains by bonding of monomers or prepolymers to one another but also the formation of a three-dimensional network by the establishment of bonds between these polymer chains, which is commonly known as crosslinking.

In accordance with the invention, the functional groups which the polymer film comprises can be chosen from the many functional groups known to be capable of acting as chain transfer agents in a chain polymerization, it being understood that the selection will preferably be made of that or those which are capable of resulting in a film/matrix bond which is the most satisfactory possible, in view of the curable resin which has to be used or the conditions under which the latter has to be polymerized.

In this respect, it is entirely possible to evaluate the effect of different functional groups on the adhesion of carbon fibres with regard to a matrix obtained from a specific resin or under specific polymerization conditions, for example by subjecting fibres, which will have been coated beforehand with a polymer film comprising one of these functional groups, to a test conventionally used to assess the mechanical properties of a fibres/matrix interface, such as, for example, a loosening test of the type of that described in Example 1 below, and by comparing the results obtained for the different functional groups thus tested.

Mention may in particular be made as functional groups capable of acting as chain transfer agents, of the —I, —Br, —Cl, —F, —SH, —OH, —NH—, —NH$_2$, —PH—, —PH$_2$ or =S functional groups and also carbon-based functional groups which are devoid of a heteroatom but which can give rise to radical transfer, such as, for example, optionally substituted allyl or benzyl —CH functional groups.

It turns out that, in the context of their studies, the Inventors have found that thiol (—SH) functional groups make it possible to obtain a particularly significant improvement in the adhesion of carbon fibres with regard to organic matrices, in particular when these matrices are obtained by polymerization of epoxy acrylate resins under ionizing radiation.

Consequently, thiol functional groups are those which are preferred.

In accordance with the invention, it is possible to coat the surface of the carbon fibres with said polymer film in different ways.

Specifically, it is possible first of all to polymerize, on the surface of the fibres, a polymerizable monomer which comprises a functional group capable of acting as chain transfer agent, in which case a polymer film is obtained which comprises, from the moment of its formation on the surface of the fibres, functional groups capable of acting as chain transfer agents.

Thus, for example, in the case where it is desirable for the functional groups capable of acting as chain transfer agents to be thiol functional groups, the polymer film can be obtained by polymerization of a polymerizable mercaptan, such as, for example, 2-propene-1-thiol, also known under the name of allyl mercaptan.

It is also possible to polymerize, on the surface of the fibres, a monomer which comprises a functional group which can be subsequently converted, by chemical reaction, to a functional group capable of acting as chain transfer agent, in which case a polymer film is obtained which comprises functional groups which are secondarily converted to functional groups capable of acting as chain transfer agents.

It is also possible to polymerize, on the surface of the fibres, a polymerizable monomer which comprises a functional group appropriate for making possible the grafting of a functional group capable of acting as chain transfer agent, in which case a polymer film is obtained onto which functional groups capable of acting as chain transfer agents are secondarily grafted.

In this case, the grafting can be carried out by reacting the functional groups present at the surface of the polymer film with an organic compound which comprises a functional group capable of acting as chain transfer agent or which generates, during the reaction, groups comprising such a functional group.

Thus, for example, in the case where it is desirable for the functional groups capable of acting as chain transfer agents to be thiol functional groups, it is possible to deposit, on the surface of the fibres, a polymer film comprising carboxyl functional groups and then to react these carboxyl functional groups with an episulphide which, by ring opening, becomes covalently bonded to these carboxyl functional groups and simultaneously generates groups comprising a thiol functional group.

A polymer film comprising carboxyl functional groups is, for example, a film obtained by polymerization of a polymerizable acid or of a polymerizable acid derivative, such as, for example, an acid anhydride, since the anhydride functional groups spontaneously hydrolyse to give carboxylic acid functional groups in ambient air. Mention may be made, as examples of polymerizable acid, of acrylic acid and methacrylic acid and, as example of polymerizable acid anhydride, of maleic anhydride.

With regard to the episulphide, it can, for example, be propylene sulphide, ethylene sulphide, cyclohexene sulphide, epithiodecane, epithiododecane or 7-thiabicyclo[4.1.0]heptane.

Whether or not the polymer film straightaway carries functional groups capable of acting as chain transfer agents, it is preferable for this film to form, at the surface of the carbon fibres, a continuous coating which adheres to this surface and which has a thickness sufficient to suitably perform its role of barrier between this surface of the fibres and the medium in which they occur but which is not excessively great, in order not to substantially affect in a detrimental fashion the mechanical properties of these fibres, in particular their elastic modulus and their toughness.

Consequently, the polymer film typically exhibits a thickness ranging from 10 to 50 nm, preferably from 10 to 30 nm and better still from 15 to 25 nm.

In order to do this, it is preferably obtained by the "Plasma Assisted Chemical Vapour Deposition" technique, which is referred to more simply in the literature as PACVD or plasma polymerization and which makes it possible to form a very thin polymer film on the surface of a substrate from a gas phase comprising the precursor monomer of this polymer. This deposition technique exhibits, among other advantages, that of being able to be used for a very great variety both of monomers and of substrates.

In the context of the invention, it is preferable for the plasma to be pulsed-mode radiofrequency-induced, this being because a pulsed activation of the monomers makes it possible to obtain a greater degree of retention of the polymer film which is formed on the surface of the fibres than that which would be obtained by a continuous activation and thus a greater functionalization of this surface.

Of course, it is also possible to use deposition techniques other than plasma polymerization provided that they lend themselves to the deposition of polymers, in the form of thin and adherent films, on carbon-based substrates, which is, for example, the case with electrodeposition or Chemical Vapour Deposition (CVD).

Once the carbon fibres have been treated by the process according to the invention, they can either be used immediately in the manufacture of components made of composite materials or can be stored for the purpose of subsequent use, or can be processed, for example in the form of preimpregnated mats, for the purpose of their delivery to manufacturers of components made of composite materials. This is because the process according to the invention can be carried out equally well by the manufacturers of carbon fibres and by their users.

In addition to the advantages mentioned above, the process according to the invention also exhibits those of being applicable to a great many types of carbon fibres participating in the manufacture of composite materials (long fibres, medium-length fibres, short fibres, oxidized fibres, sized fibres, and the like), of being relatively simple to carry out and of having a cost entirely compatible with use on an industrial scale.

Another subject-matter of the invention is a process for the manufacture of a component made of composite material comprising carbon fibres and an organic matrix, which process comprises bringing the fibres into contact with a resin which can be cured by chain polymerization, followed by the polymerization of the resin, and is characterized in that it additionally comprises the implementation of a process as defined above, before the fibres are brought into contact with said resin.

In accordance with the invention, the curable resin can be chosen from any resin capable of curing by a chain polymerization mechanism, whether under the effect of heat or under the effect of light or ionizing radiation, this being because the Inventors have found, in the context of their studies, that the process according to the invention is effective both in the case of a thermosetting resin and of a photo- or radiation-curable resin.

However, for the reasons set out above, the resin is preferably chosen from resins which can be polymerized under radiation and in particular from resins of multiacrylates type, such as epoxy acrylates, novolac acrylates and polyurethane acrylates, bismaleimide resins and epoxide resins, epoxy acrylate resins being particularly preferred in the case where the composite material is intended for space or aeronautical applications.

It is obvious that the manufacture of this component made of composite material can be carried out according to any technique known to a person skilled in the art of composite materials, such as, for example, simultaneous spray moulding, vacuum moulding, moulding by low pressure injection of resin (Resin Transfer Moulding (RTM)), low pressure "wet route" cold press moulding, compound injection moulding (Bulk Moulding Compound (BMC)), moulding by compression of preimpregnated mats (Sheet Moulding Compound (SMC)), filament winding moulding, centrifugal moulding or pultrusion moulding.

Other characteristics and advantages of the process according to the invention will become more clearly apparent on reading the remainder of the description which follows, which relates to an example of the implementation of this process and which refers to the appended drawing.

Of course, this example is given solely by way of illustration of the subject-matter of the invention and does not under any circumstances constitute a limitation on this subject-matter.

BRIEF DESCRIPTION OF THE DRAWING

FIG. 1 schematically illustrates the various stages of an exemplary embodiment of the process according to the invention, in which the surface of carbon fibres is coated with a polymer film comprising thiol functional groups.

DETAILED ACCOUNT OF AN EXEMPLARY EMBODIMENT OF THE PROCESS ACCORDING TO THE INVENTION

The present example relates to the treatment of carbon fibres in order to coat the surface thereof with a polymer film comprising thiol functional groups.

As can be seen in FIG. 1, which schematically illustrates the stages of this treatment, the latter comprises:
   the deposition of a film of poly(maleic anhydride) on the surface of the fibres by pulsed radiofrequency plasma polymerization of maleic anhydride; and then
   the grafting of groups comprising a thiol functional group to the film of poly(maleic anhydride) thus obtained.

The carbon fibres used are Tenax® IMS 5001 fibres sold by Toho Tenax Europe GmbH. They are ex-PAN fibres having an intermediate modulus and which have been subjected to a surface electrolytic oxidation treatment during their manufacture.

The plasma polymerization of maleic anhydride—which corresponds to stage 1 of FIG. 1—is carried out using a PACVD device analogous to that described by Siffer et al. in *Analytica Chimica Acta*, 539, 289-299, 2005 [7]. In brief, this device comprises a cylindrical glass reactor around which are wound coils of copper which make it possible to induce electrical discharges in the plasma, a radiofrequency generator and a tuning box which matches the impedance of the reactor to that of the generator.

The carbon fibres are placed in the reactor in the form of a tuft, the ends of which are attached to the two opposite edges of a vertical mounting made of board or glass.

The following operating parameters are used:
discharge power: 5 W
pressure: $2.6 \times 10^{-1}$ mbar
maleic anhydride flow rate: $1.6 \times 10^{-9}$ kg.s$^{-1}$
pulse on-time: 20 µs
pulse off-time: 1200 µs
deposition time: 30 min.

At the end of treatment, the generator is switched off and the maleic anhydride in the vapour phase continues to pass through the reactor for 5 minutes.

Carbon fibres are thus obtained, the surface of which is entirely coated with a film (referenced 10 in FIG. 1) of poly(maleic anhydride) with a thickness of 20 nm, approximately 32% of the anhydride functional groups of which have not polymerized.

As illustrated by stage 2 of FIG. 1, these anhydride functional groups rapidly hydrolyse in ambient air to give carboxylic acid functional groups.

The grafting of the groups comprising a thiol functional group—which corresponds to stage 3 of FIG. 1—is carried out by reacting these carboxylic acid functional groups with propylene sulphide in an organic solvent and in the presence of triethylamine. By this reaction, two types of groups comprising a thiol functional group, the chemical structures of which are shown in FIG. 1, are capable of becoming attached to the poly(maleic anhydride) film.

The solvent used is toluene, this being because its low polarity makes it possible to limit the occurrence of undesirable side reactions.

The reaction is carried out using 53.6 mmol of propylene sulphide, 5.7 mmol of triethylamine and 45 ml of toluene per 0.6 g of carbon fibres.

It is carried out in an enclosed environment, without addition of pressure, at 90° C. and for 10 hours.

In practice, a round-bottomed glass flask is used. Stirring and the desired temperature are provided by a heating magnetic stirrer and a magnetic bar. Furthermore, in order to prevent the fibres from getting in a tangle around the bar, they are placed in the round-bottomed flask by being enclosed beforehand in a nonwoven polypropylene bag which is permeable but resistant to toluene.

After reacting for 10 hours, the fibres are subjected to two washing operations with an acetic acid/toluene (10/90, v/v) solution in order to remove the triethylamine and finally to two washing operations with toluene, each washing operation being rapidly carried out in a beaker.

The fibres are subsequently subjected to a Soxhlet extraction with toluene for 5 to 6 hours in order to remove all the impurities liable to be present at their surface, followed by drying at 40° C. for 12 hours under low vacuum. They are then stored in polyethylene bags which are stored in a desiccator.

The adhesion of the carbon fibres thus treated with regard to an organic matrix obtained by chain polymerization of a resin is assessed by a loosening test. In order to do this, use is made of an epoxy acrylate resin sold by UCB Chemicals under the reference EB600.

In brief, this loosening test consists in immersing the end of a monofilament in a microdrop of resin, in bringing about the polymerization of the resin at ambient temperature, either under an electron beam or by UV irradiation, and in then exerting a tensile stress on the other end of the monofilament, at the rate of 1 mm/min, while keeping the drop of resin stationary.

The tensile force is recorded over time. The maximum tensile force recorded is regarded as the force necessary for the loosening of the monofilament from the cured resin drop.

The InterFacial Shear Strength (IFSS) is determined using the following formula:

$$\tau = \frac{\sigma f d}{4L} = \frac{F}{2\pi r L}$$

in which:
d represents the diameter of the monofilament, expressed in meters;
r represents the radius of the monofilament, expressed in meters;
L represents the length of monofilament initially inserted into the drop of resin, expressed in meters;
F represents the force necessary for the loosening of the monofilament from the cured resin drop, expressed in newtons, and $$\sigma f = \frac{F}{\pi r^2} \text{ (in newton/m}^2\text{)}.$$

The IFSS values obtained for the IMS 5001 fibres treated in accordance with the invention are presented in Table I below.

The IFSS values obtained for, first, IMS 5001 fibres which have not been subjected to any treatment and, secondly, IMS 5001 fibres which have had directly (that is to say without preliminary deposition of a poly(maleic anhydride) film) grafted to their surface groups containing a thiol functional group by reaction of the carboxylic acid groups present at the surface of these fibres with propylene sulphide under conditions analogous to those described above are also recorded in this table, by way of comparison.

TABLE 1

| | IFSS (MPa) | |
|---|---|---|
| Fibres | Polymerization under an electron beam | Polymerization under UV irradiation |
| Untreated fibres | 34 ± 3 | 49 ± 3 |
| Fibres grafted with carbon-based groups comprising a thiol functional group | 59 ± 3 | — |
| Fibres treated in accordance with the invention | 78 ± 8 | 76 ± 3 |

This table shows that the adhesion of carbon fibres with regard to a matrix obtained by polymerization of a resin under light radiation or ionizing radiation is very significantly increased when the surface of these fibres is coated beforehand with a polymer film comprising thiol functional groups capable of acting as chain transfer agents during the polymerization of the resin.

It also shows that while, in the case of untreated carbon fibres, the adhesion of the fibres with regard to the matrix is substantially different according to whether polymerization of the resin is induced by ultraviolet irradiation or by an electron beam, there no longer exists a significant difference between these two methods of induction in the case of fibres treated in accordance with the invention.

The invention is not in the least limited to the embodiment which has just been specifically described. Thus, for example, it is entirely possible to envisage treating sized carbon fibres by the process according to the invention, in which case the sizing agent will be removed beforehand from these fibres, for example by dissolution by solvents, as is well known in the state of the art.
Documents Cited
[1] JP-A-3076869
[2] EP-A-1 484 435
[3] EP-A-0 640 702
[4] JP-B-2002-327374
[5] Wu et al., *Carbon,* 34, 59-67, 1996
[6] Tsubokawa, *Carbon,* 31, 1257-1263, 1993
[7] Siffer et al., *Analytica Chimica Acta,* 539, 289-299, 2005

The invention claimed is:

1. A process for improving the adhesion of carbon fibers to an organic matrix made of a cured resin, said organic matrix forming a composite material with the carbon fibers, the process comprising:
    coating a surface of carbon fibers with a polymer film comprising functional groups capable of acting as chain transfer agents during a chain transfer polymerization of a resin curable by chain transfer polymerization, to obtain coated carbon fibers;
    bringing the coated carbon fibers into contact with the curable resin; and
    inducing the chain transfer polymerization of the curable resin to obtain a cured resin, thereby producing an organic matrix and forming a composite material,
    wherein the functional groups of the polymer film act as chain transfer agents during the chain transfer polymerization of the curable resin and thereby improve adhesion of the carbon fibers to the organic matrix.

2. The process according to claim 1, wherein the functional groups of the polymer film are —I, —Br, —Cl, —F, —SH, —OH, —NH—, —NH$_2$, —PH, —PH$_2$ or =S functional groups.

3. The process according to claim 2, wherein the functional groups of the polymer film are thiol functional groups.

4. The process according to claim 1, wherein the coating of the surface of the carbon fibers with the polymer film comprises polymerizing on the surface of the carbon fibers a polymerizable monomer comprising the functional groups capable of acting as chain transfer agents.

5. The process according to claim 1, wherein the coating of the surface of the carbon fibers with the polymer film comprises:
    a) polymerization on the surface of the carbon fibers a polymerizable monomer comprising one chemical group which can be converted to one of the functional groups capable of acting as chain transfer agents, to obtain a polymer film a) comprising chemical groups which can be converted to the functional groups capable of acting as chain transfer agents; then
    b) converting the chemical groups of the polymer film a) to the functional groups capable of acting as chain transfer agents.

6. The process according to claim 1, wherein the coating of the carbon fibers with the polymer film comprises:
    a) polymerization on the surface of the carbon fibers a polymerizable monomer comprising one chemical group which can be grafted with one of the functional groups capable of acting as chain transfer agents, to obtain a polymer film a) comprising chemical groups which can be grafted with the functional groups capable of acting as chain transfer agents; then
    b) grafting the functional groups capable of acting as chain transfer agents to the chemical groups of the polymer film a).

7. The process according to claim 6, wherein the grafting of the functional groups capable of acting as chain transfer agents comprises reacting the chemical groups of the polymer film a) with an organic compound which, by ring opening, becomes covalently bonded to said chemical groups and generates functional groups capable of acting as chain transfer agents.

8. The process according to claim 7, wherein the chemical groups of the polymer film a) are carboxyl groups and are reacted with an episulphide which generates thiol functional groups.

9. The process according to claim 8, wherein the polymer film comprising carboxyl groups is obtained by polymerization of a polymerizable acid or of a polymerizable acid derivative.

10. The process according to claim 9, wherein:
    the polymer film comprising carboxyl groups is obtained by polymerization of a polymerizable acid derivative; and
    the polymerizable acid derivative is an acid anhydride.

11. The process according to claim 9, wherein the episulphide is selected from the group consisting of propylene sulphide, ethylene sulphide, cyclohexene sulphide, epithiodecane, epithiododecane and 7-thiabicyclo [4.1.0] heptane.

12. The process according to claim 1, wherein the polymer film has a thickness ranging from 10 to 50 nm.

13. The process according to claim 1, wherein the coating of the surface of the carbon fibers with the polymer film is carried out by Plasma Assisted Chemical Vapour Deposition (PACVD).

14. The process according to claim 13, wherein the plasma is pulsed-mode radiofrequency-induced.

15. A process for the manufacture of a composite material comprising carbon fibers and an organic matrix made of a cured resin, the process comprising:
    coating a surface of carbon fibers with a polymer film comprising functional groups capable of acting as chain transfer agents durbing a chain transfer polymerization of a resin curable by chain transfer polymerization, to obtain coated carbon fibers;
    bringing the coated carbon fibers into contact with the curable resin; and
    inducing the chain transfer polymerization of the curable resin to obtain a cured resin, thereby producing an organic matrix and forming a composite material,
    wherein the functional groups of the polymer film act as chain transfer agents during the chain transfer polymerization of the curable resin and thereby improve adhesion of the carbon fibers to the organic matrix.

16. The process according to claim 15, wherein the curable resin is a resin which can be cured under radiation.

17. The process according to claim 16, wherein the curable resin is selected from the group consisting of an epoxy acrylate resin, a novolac acrylate, a polyurethane acrylate, a bismaleimide resin and an epoxide resin.

18. The process according to claim 17, wherein the curable resin is an epoxy acrylate resin.

19. The process according to claim 9, wherein:
the polymer film comprising carboxyl groups is obtained by polymerization of a polymerizable acid derivative; and
the polymerizable acid derivative is maleic anhydride.

20. The process of claim 1, wherein the chain transfer polymerization of the curable resin is induced with radiation.

* * * * *